US012044497B2

(12) United States Patent
Sprinkel et al.

(10) Patent No.: US 12,044,497 B2
(45) Date of Patent: Jul. 23, 2024

(54) FIREARM CLEANING DEVICE

(71) Applicant: Tanner S. Sprinkel, Hockley, TX (US)

(72) Inventors: Tanner S. Sprinkel, Hockley, TX (US); Darin R. Hotvedt, Manhattan, MT (US); Dustin B. Byrd, Bozeman, MT (US); Timothy T. Merica, Bozeman, MT (US)

(73) Assignee: Tanner S. Sprinkel, Hockley, TX (US)

( * ) Notice: Subject to any disclaimer, the term of this patent is extended or adjusted under 35 U.S.C. 154(b) by 471 days.

(21) Appl. No.: 17/474,032

(22) Filed: Sep. 13, 2021

(65) Prior Publication Data

US 2022/0082347 A1 Mar. 17, 2022

Related U.S. Application Data

(60) Provisional application No. 63/077,876, filed on Sep. 14, 2020.

(51) Int. Cl.

*F41A 29/02* (2006.01)
*B08B 9/04* (2006.01)
*B08B 9/043* (2006.01)

(52) U.S. Cl.

CPC ................ *F41A 29/02* (2013.01); *B08B 9/04* (2013.01); *B08B 9/0436* (2013.01); *B08B 2209/04* (2013.01)

(58) Field of Classification Search

CPC . F41A 29/02; B08B 9/04; B08B 9/043; B08B 9/0436; B08B 2209/04

USPC ........................................................ 15/104.18

See application file for complete search history.

(56) References Cited

U.S. PATENT DOCUMENTS

| | | | | | |
|---|---|---|---|---|---|
| 43,573 | A | * | 7/1864 | Crane | |
| 92,790 | A | * | 7/1869 | Brown | |
| 214,500 | A | * | 4/1870 | Felthousen | |
| 481,858 | A | * | 8/1892 | Ferris | |
| 488,842 | A | * | 12/1892 | Shultz | |
| 721,608 | A | * | 2/1903 | Ruggles | |
| 767,133 | A | * | 8/1904 | Brittain | |
| 1,872,198 | A | * | 8/1932 | Rixel, Jr. ................ | F41A 29/02 15/104.095 |

* cited by examiner

*Primary Examiner* — Randall E Chin

(74) *Attorney, Agent, or Firm* — Eric B. Fugett; Mark A. Pitchford; Pitchford Fugett, PLLC

(57) ABSTRACT

A device for cleaning an interior surface of a firearm includes a housing, an expandable scraping assembly, a control knob, and a drive rod. The housing extends longitudinally along a longitudinal axis. The housing has a forward end and a rear end longitudinally opposite the forward end. The expandable scraping assembly is located at the forward end of the housing. The control knob is located at the rear end of the housing. The drive rod is received within the housing and coupled to the scraping assembly and the control knob. Rotation of the control knob in a first direction expands the scraping assembly toward an open position. Rotation of the control knob in a second direction opposite the first direction contracts the scraping assembly toward a closed position.

18 Claims, 6 Drawing Sheets

FIREARM CLEANING DEVICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This non-provisional patent application claims priority to U.S. Provisional Patent Application Ser. No. 63/077,876, filed Sep. 14, 2020 and titled "FIREARM CLEANING DEVICE," the entire disclosure of which is hereby incorporated by reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to the field of firearms. More particularly, the invention relates to cleaning devices for firearms.

AR-pattern (i.e., AR-style) firearms are a family of firearms that share the same core design pattern and include the famous AR-15®, AR-10®, M4 carbine, and M16 rifles, the construction and operation of which are well-known. AR-pattern rifles are employed by NATO forces around the world, and the semi-automatic AR-15® rifle is the most popular and widely owned firearm currently in use in the United States.

AR-pattern firearms typically employ either a direct impingement or gas piston operating system to cycle the bolt assembly. Both operating systems use a rotating bolt that locks into a barrel extension behind the cartridge case head when a cartridge is chambered. The bolt head includes a plurality of radially extending locking lugs (i.e., "bolt lugs") that mate with a plurality of protrusions or lugs in the barrel extension (i.e., "barrel extension lugs"). Once the bolt has pushed a cartridge into the chamber such that the bolt head is received in a space or recess forward of the barrel extension lugs and proximate the chamber (the "locking lug recess"), the bolt rotates to cause the bolt lugs to engage the forward end of the barrel extension lugs and thus firmly lock the bolt in place behind the case head. This enables the bolt to withstand the pressure generated upon discharge of the cartridge. When the cartridge is fired, the bolt rotates in the opposite direction and retracts to extract and eject the spent casing before chambering a new round.

Discharge of an AR-pattern rifles typically causes carbon and gunpowder residue to build up within multiple areas of the firearm, particularly in the locking lug recess between the barrel extension lugs and the chamber. This is both undesirable and unavoidable. Additionally, depending on the environment in which a firearm is used, external debris such as sand, dirt, mud, and rust can also build up in and around this area. Excessive build-up of carbon residue and other debris can lead to interruptions and malfunctions in cycling of the firearm, including but not limited to stoppages, bolt seizures, and extraction failure. Whereas cycling malfunctions are merely inconvenient for recreational civilian shooters, unexpected stoppages can be life threatening for operators in a kinetic combat environment. Regular and thorough cleaning of the area of the locking lug recess is therefore essential to proper maintenance and functioning of AR-pattern firearms.

The most well-known options for cleaning this problem area include a variety of wire brushes, cotton swabs, and rigid monolithic scraping tools. However, brushes and cotton swabs that are flexible enough to reach behind the barrel extension lugs are not rigid enough to scrape away debris or carbon that has become affixed to the locking lug recess due to the high heat and pressure produced upon discharge of the firearm. By contrast, currently available scraping tools, while rigid, are typically unable to scrape against all surfaces of the locking lug recess because the barrel extension lugs partially block access to the recess. Accordingly, what is needed are improvements in devices for cleaning an interior surface of a firearm.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Features of the presently disclosed invention overcome or minimize some or all of the identified deficiencies of the prior art, as will become evident to those of ordinary skill in the art after a study of the information presented in this document.

It is an object of the present invention to provide a device for cleaning portions of a firearm that are proximate to the chamber, such as the locking lugs and their recesses. It is also an object of the present invention to provide a cleaning device which is able to reach behind the locking lugs. It is a further object of the present invention to provide a novel cleaning device which is rigid enough to scrape away debris and carbon that has become affixed to the locking lug recess. A still further object of the invention is to provide a firearm cleaning device which is able to exert outward pressure to scrape against all parts of the locking lugs and locking lug recess. Accordingly, aspects of the present invention provide a device for cleaning an interior surface of a firearm.

In one aspect, the device includes a housing, an expandable scraping assembly, a control knob, and a drive rod. The housing extends longitudinally along a longitudinal axis. The housing has a forward end and a rear end longitudinally opposite the forward end. The expandable scraping assembly is located at the forward end of the housing. The control knob is located at the rear end of the housing. The drive rod is received within the housing and coupled to the scraping assembly and the control knob. Rotation of the control knob in a first direction expands the scraping assembly toward an open position. Rotation of the control knob in a second direction opposite the first direction contracts the scraping assembly toward a closed position.

In another aspect, the device includes a housing, a scraping assembly, a control knob, and a drive rod. The housing has a first end and a second end. The scraping assembly is located at the first end of the housing and is configured to pivot between an open position and a closed position. The control knob is rotatably coupled to the second end of the housing. The drive rod is received within the housing and is coupled to the control knob and the scraping assembly. Rotation of the control knob in a first direction translates the drive rod toward the second end of the housing and pivots the scraping assembly toward the open position. Rotation of the control knob in a second direction opposite the first direction translates the drive rod toward the first end of the housing and pivots the scraping assembly toward the closed position.

In yet another aspect, the device includes a housing, first and second scraping members, a drive rod, and a control knob. The housing has a longitudinal axis, a forward end, and a rear end longitudinally opposite the forward end. The first and second scraping members are located at the forward end of the housing. Each scraping member includes an extension portion extending out of the forward end of the housing. The first and second scraping members are configured to pivot relative to the housing between a closed position wherein the extension portions are adjacent and an open position wherein the extension portions are spaced apart. The drive rod is received within the housing and is configured to pivot the first and second scraping members toward the open position when the drive rod is translated toward the rear end of the housing, and toward the closed position when the drive rod is translated toward the forward end of the housing. The control knob is located at the rear end of the housing and is threadably coupled to the drive rod. Rotation of the control knob in a first direction translates the drive rod toward the rear end of the housing. Rotation of the control knob in a second direction opposite the first direction translates the drive rod toward the forward end of the housing Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the portions relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
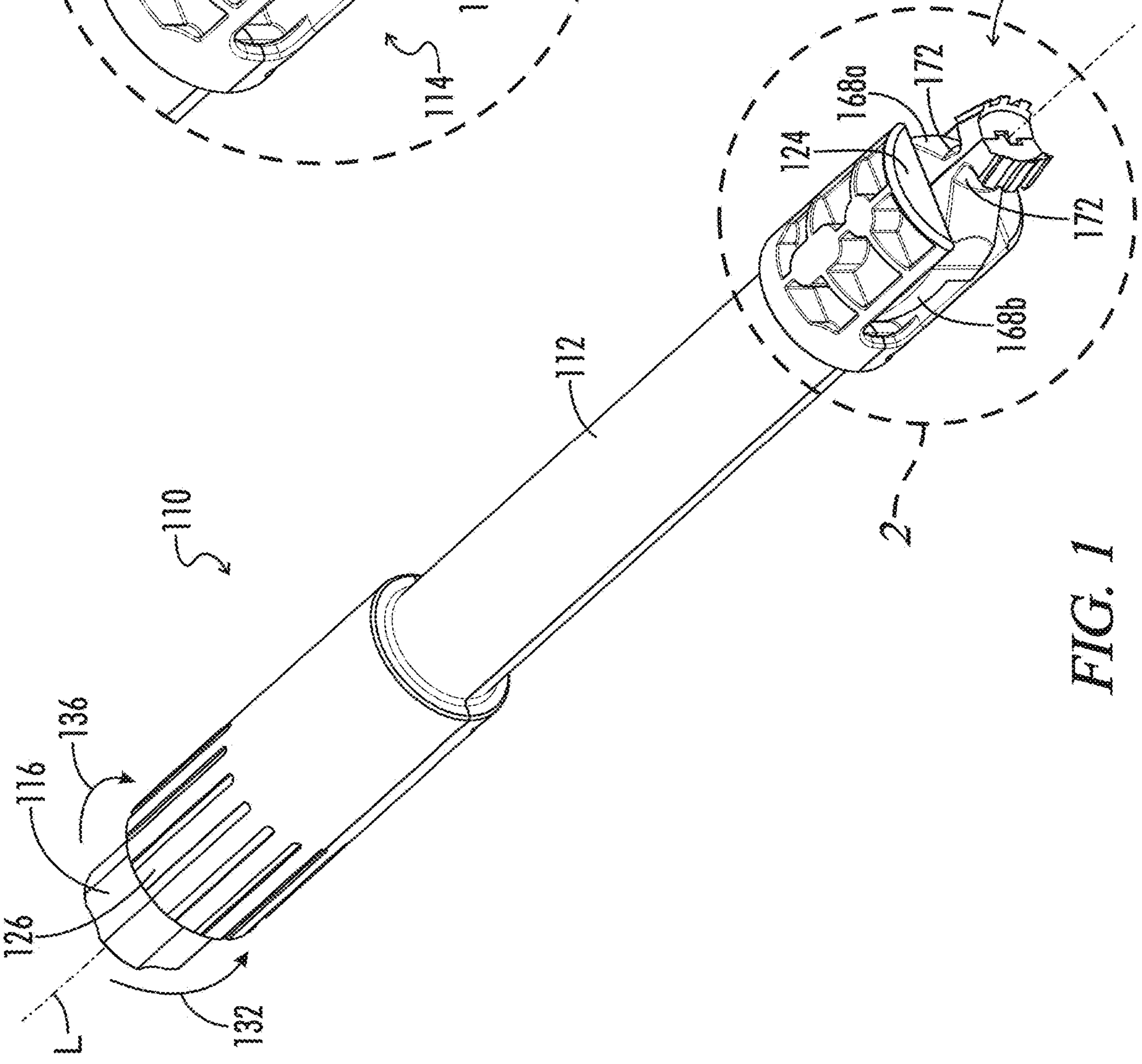
FIG. 1 is an elevated front perspective view of an embodiment of a firearm cleaning device of the present invention showing the device in a closed (i.e., contracted) position.

As described herein, an "upright" position is considered to be the position of apparatus components while in proper operation or in a natural resting position as described and shown herein, for example, in FIG. 1. "Vertical," "horizontal," "above," "below," "side," "top," "bottom," "upper," "lower," and other orientation terms are described with respect to this upright position during operation, unless otherwise specified, and are used to provide an orientation of embodiments of the invention to allow for proper description of example embodiments. A person of skill in the art will recognize, however, that the apparatus can assume different orientations when in use. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

As used herein, the term "forward" refers to a direction extending along a longitudinal axis of the apparatus toward a portion of the apparatus configured to scrape an interior surface of a firearm. Conversely, the term "rearward" refers to a direction extending along the longitudinal axis of the apparatus away from the portion of the apparatus configured to scrape an interior surface of a firearm and toward an opposite end of the apparatus. A "rearward" direction is thus the opposite of a "forward" direction.

All combinations of method or process steps as used herein can be performed in any order, unless otherwise specified or clearly implied to the contrary by the context in which the referenced combination is made.

The methods and devices disclosed herein, including components thereof, can comprise, consist of, or consist essentially of the essential elements and limitations of the embodiments described herein, as well as any additional or optional components or limitations described herein or otherwise useful.

Figure 2:
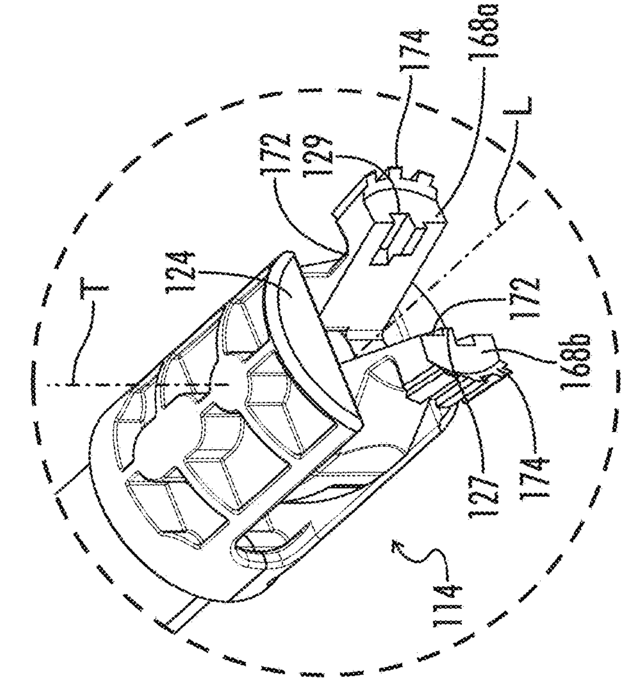
FIG. 2 is an enlarged detailed view of the device of FIG. 1 at location A showing the device in an open (i.e., expanded) position.

Referring now to FIGS. 1-14, a device 110 for cleaning an interior surface of a firearm constructed according to an embodiment of the present invention is shown. The device 110 includes a housing 112, a scraping assembly 114, a control knob 116, and a drive rod 118. The housing 112 extends longitudinally along a longitudinal axis L. The housing 112 has a forward end 124 and a rear end 126. The rear end 126 is longitudinally opposite the forward end 124. The scraping assembly 114 is disposed at the forward end 124 of the housing 112. The scraping assembly 114 is expandable in that the scraping assembly 114 is configured to pivot between a closed position (see FIG. 1) and an open position (see FIG. 2). The control knob 116 is disposed at and rotatably coupled to the rear end 126 of the housing 112. The drive rod 118 is received within the housing 112 and coupled to the scraping assembly 114 and the control knob 116. Rotation of the control knob 116 in a first direction 132 expands the scraping assembly 114 toward the open position (see FIG. 2), while rotation of the control knob 116 in a second direction 136 opposite the first direction 132 contracts the scraping assembly 114 toward the closed position (see FIG. 1).

Figure 3:
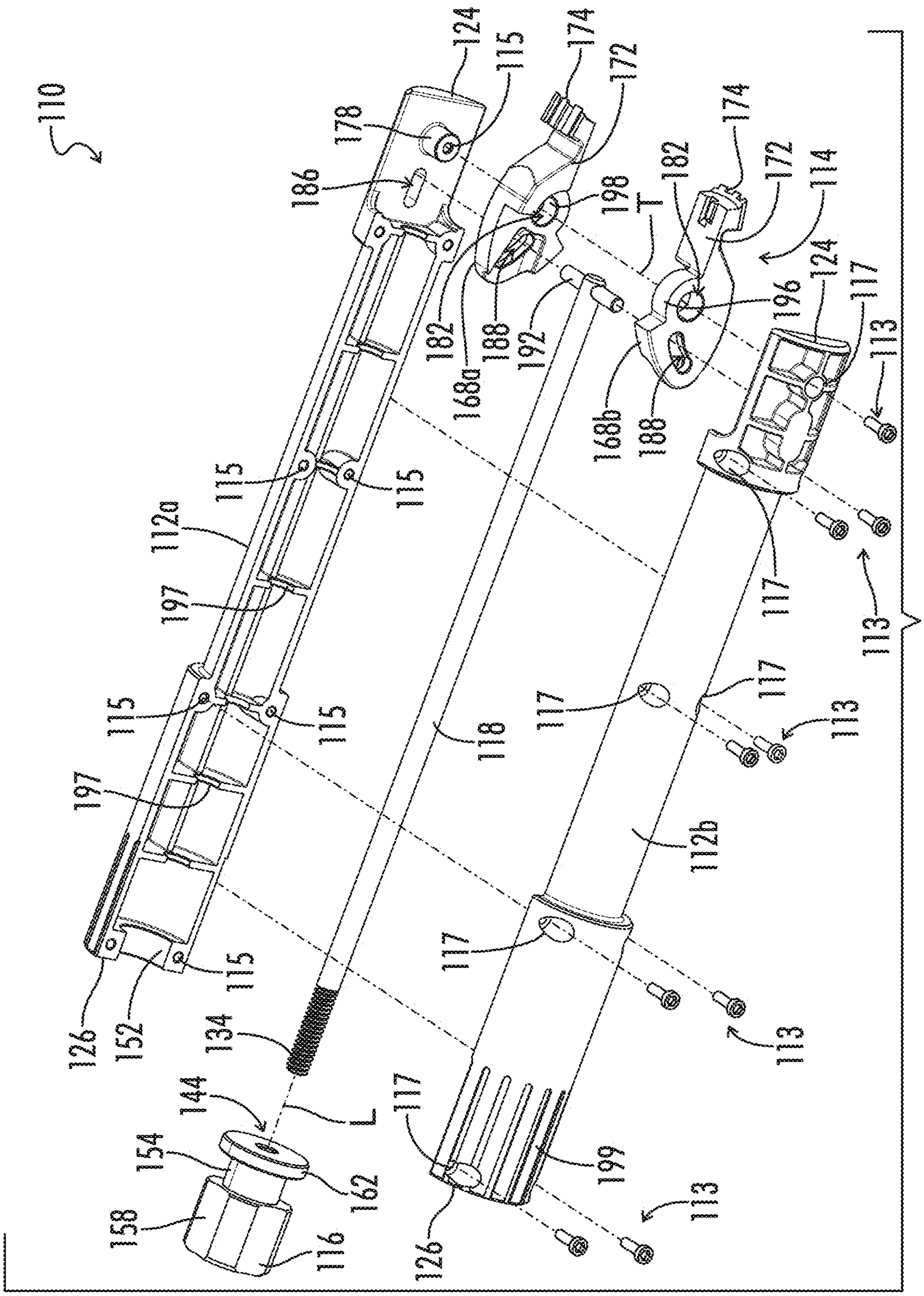
FIG. 3 is a partially exploded depressed perspective view of the device of FIG. 1.

The housing 112 can include two housing portions 112*a*, 112*b* secured together via a plurality of threaded fasteners 113. A first housing portion 112*a* includes a plurality of threaded apertures 115 defined therein, and a second housing portion 112*b* includes a plurality of counterbored through holes 117 which align with the threaded apertures 115 of the first housing portion 112*a* when the two housing portions 112*a*, 112*b* are properly aligned as shown in FIG. 3. The threaded fasteners 113 are receivable in threaded apertures 115 through counterbored through holes 117 to secure the second housing portion 112*b* to the first housing portion 112*a*, as shown in FIG. 3. With the exception of threaded apertures 115 and through holes 117, each housing portion 112*a*, 112*b* is otherwise identical to the other. The housing 112 also includes a plurality of stabilizing projections 197 to guide and stabilize the drive rod 118 within the housing 112.

Figure 6:
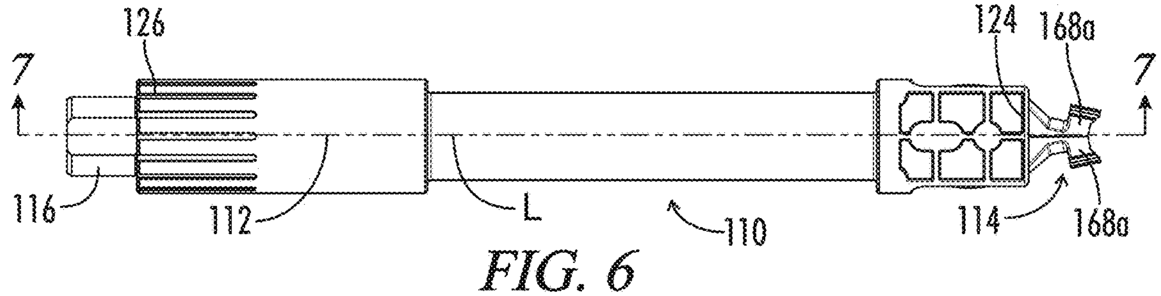
FIG. 6 is a top plan view of the device of FIG. 1.
Figure 7:
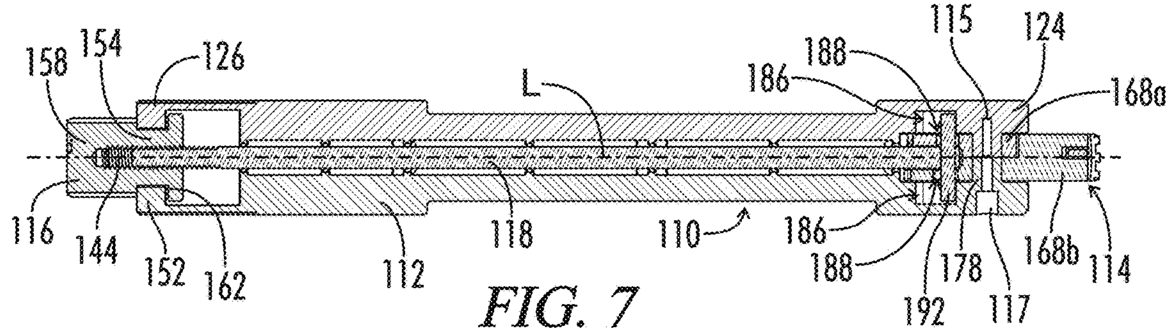
FIG. 7 is a sectional view of the device of FIG. 1 taken along line 7-7 of FIG. 6. Threaded fasteners are omitted for clarity.
Figure 8:
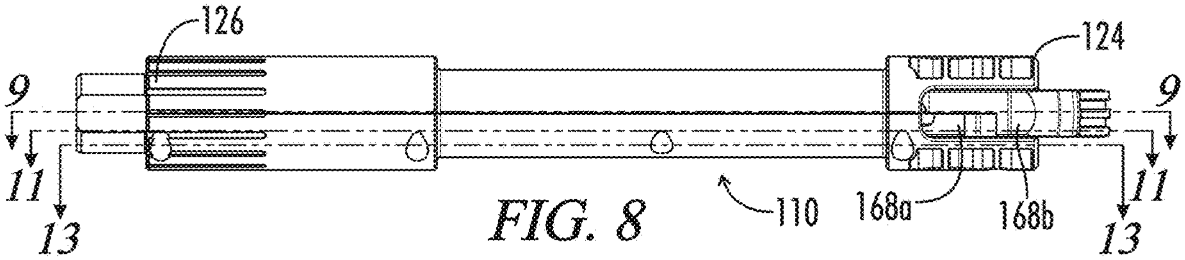
FIG. 8 is a right-side elevational view of the device of FIG. 1. Threaded fasteners are omitted for clarity.

As best shown in FIGS. 6-7, the rear end 126 of the housing 112 is configured to substantially prevent longitudinal movement (i.e., movement along longitudinal axis L) of the control knob 116 relative to the housing 112 without restricting rotation of the control knob 116 relative to the housing 112. Put another way, the control knob 116 and the rear end 126 of the housing 112 are configured to substantially limit movement of the control knob 116 relative to the housing 112 to bidirectional rotation about the longitudinal axis L. To this end, the rear end 126 of the housing 112 includes a circular collar 152 configured to mate with and retain the control knob 116 at the rear end 126 of the housing 112. The circular collar 152 protrudes radially inwardly from an inner surface of the housing toward longitudinal axis L. The control knob 116 includes a neck 154, a main body 158, and a circular flange 162. The main body 158 and circular flange 162 are adjacent to opposite sides of the neck 154. Put differently, the circular flange 162 is opposite the neck 154 from the main body 158. The neck 154 has a diameter less than that of the main body 158 and the circular flange 162. The neck 154 corresponds to the circular flange 162 in shape. The circular flange 162 is received inside the rear end 126 of the housing 112 adjacent the collar 152 and the collar 152 is received in the neck 154. In this way, the collar 152 is captured in the neck 154 between the main body 158 and the circular flange 162. Thus, longitudinal movement of the control knob 116 relative to the housing 112 is substantially prevented, while rotation of the control knob 116 relative to the housing 112 is unrestricted. This arrangement also prevents the control knob 116 from becoming inadvertently separated from the housing 112.

Figure 9:
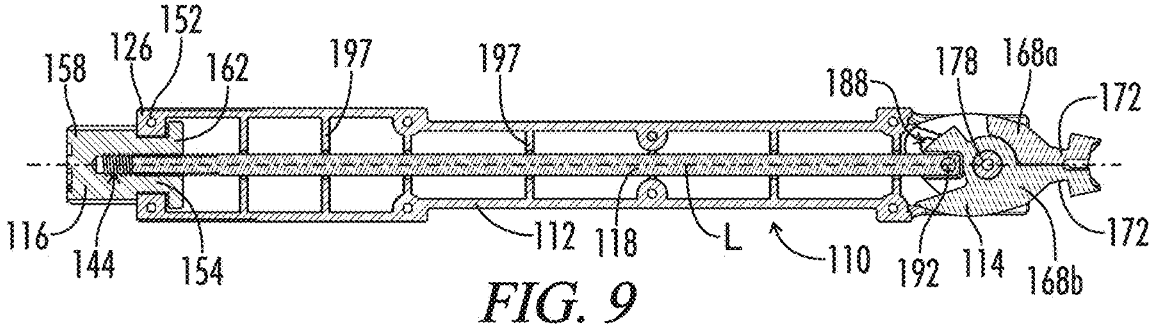
FIG. 9 is a sectional view of the device of FIG. 1 taken along line 9-9 of FIG. 8.
Figure 10:
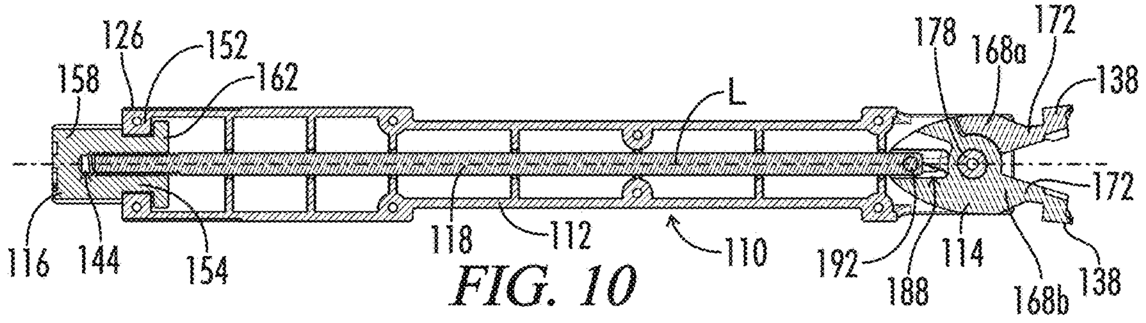
FIG. 10 is a sectional view of the device of FIG. 1 taken along line 9-9 of FIG. 8 showing the device in the open (i.e., expanded) position.

The control knob 116 also includes a threaded socket 144 defined therein. The threaded socket 144 extends along the longitudinal axis L through the circular flange 162, the neck 154, and at least a portion of the main body 158. A rear end 134 of the drive rod 118 is threaded with screw threads complimentary to the threads of threaded socket 144. The threaded rear end 134 of the drive rod 118 is threadably received in the threaded socket 144, as best shown in FIGS. 9-10. As such, rotation of the control knob 116 in the first direction 132 draws the drive rod 118 into the socket 144 and translates the drive rod 118 toward the rear end 126 of the housing 112. Translation of the drive rod 118 toward the rear end 126 of the housing 112 in turn pivots the scraping assembly 114 toward the open position. By contrast, rotation of the control knob 116 in the second direction 136 extends the drive rod 118 from the socket 144 and translates the drive rod 118 toward the forward end 124 of the housing 112. Translation of the drive rod 118 toward the forward end of the housing 112 in turn pivots the scraping assembly 114 toward the closed position. In some embodiments, the socket 144 can include a region of unthreaded free bore toward its rearmost end at the back of main body 158 in order to reduce friction resulting from threading of the drive rod 118 in or out of the control knob 116 during use.

Figure 4:
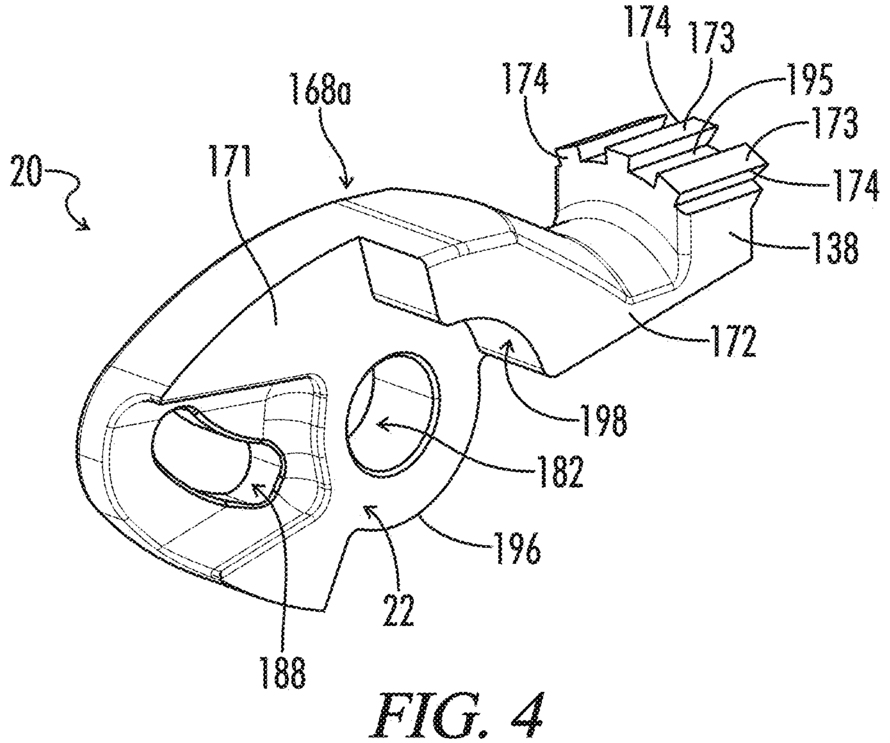
FIG. 4 is a first perspective view of a scraping member of the device of FIG. 1.
Figure 5:
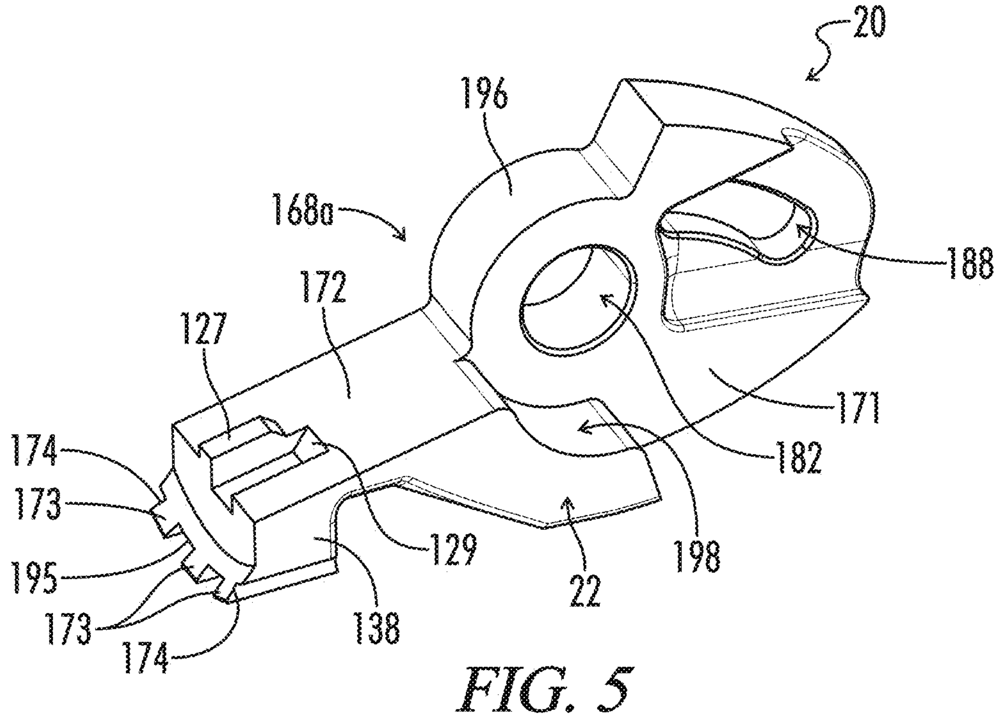
FIG. 5 is a second perspective view of the scraping member of FIG. 4.

As best shown in FIGS. 4-5, the scraping assembly 114 includes a pair of scraping members 168*a*, 168*b* pivotably coupled to the forward end 124 of the housing 112. Each scraping member 168*a*, 168*b* includes a body portion 171, an extension portion 172 extending from the body portion 171, and a head portion 138 at a forward end of the extension portion 172 opposite the body portion 171. A plurality of elongate scraping projections 173 are formed on the head portion 138 of each scraping member 168*a*, 168*b*. Each scraping projection 173 defines a pair of scraping edges 174. The scraping edges 174 can be used to scrape portions of a firearm in order to remove carbon buildup or debris. Each extension portion 172 extends out of the housing 112 such that each head portion 138 is distal to the forward end 124 of the housing 112. As such, the scraping projections 173 and associated scraping edges 174 on each head 138 are likewise distal to the forward end 124 of the housing 112. Each of the scraping members 168*a*, 168*b* is configured to pivot relative to the housing 112 such that the extension portions 172 (and thus the head portions 138) are adjacent when the scraping assembly 114 is in the closed position and spaced apart when the scraping assembly 114 is not in the closed position (e.g., the open position). In other words, the extension portions 172, the head portions 138, the scraping projections 173, and the scraping edges 174 are all closer together when the scraping assembly 114 is in the closed position than when the scraping assembly 114 is in the open position.

Each scraping member 168*a*, 168*b* also includes a plurality of debris channels 195. Each debris channel 195 is located between adjacent scraping projections 173 on the head portion 138 of each scraping member 168*a*, 168*b*. The debris channels 195 gather debris removed by the scraping edges 174 from an interior surface of a firearm and facilitate removal of the debris from the firearm when the scraping assembly 114 is removed from the firearm.

The scraping members 168*a*, 168*b* are pivotably coupled to the forward end 124 of the housing 112. The forward end 124 of the housing 112 defines a pair of opposing pivot studs 178. Each pivot stud 178 extends from an opposing surface of the forward end 124 of each housing portion 112*a*, 112*b*. The pivot studs 178 define a transverse axis T that extends transverse to the longitudinal axis L. The body portion 171 of each scraping member 168*a*, 168*b* defines a pivot aperture 182 in which a respective pivot stud 178 of the pair of pivot studs 178 is received such that each scraping member 168 is pivotable about the respective pivot stud 178. Thus, each pivot stud 178 of the pair of opposing pivot studs 178 is received in the respective pivot aperture 182 of the pair of scraping members 168*a*, 168*b*, as best shown in FIGS. 3 and 7.

As shown in FIGS. 6-7, a threaded aperture 115 extends through one pivot stud 178 of the pair, while a counterbored through hole 117 extends through the other. As such, a threaded fastener 113 is receivable in the threaded aperture 115 of one pivot stud 178 through the through hole 117 of the other pivot stud 178 to secure the pair of opposing pivot studs together and thereby prevent inadvertent separation of the pivot studs. This in turn prevents the scraping members 168*a*, 168*b* from inadvertently slipping off the pivot studs during use.

Pivoting movement of the scraping members 168*a*, 168*b* is driven by drive rod 118 and is achieved through cooperation of multiple structures included in device 110. As shown in FIGS. 9-10, the drive rod 118 is configured to pivot the pair of scraping members 168 toward the open position when the drive rod 118 is translated toward the rear end 126 of the housing 112, and toward the closed position when the drive rod 118 is translated toward the forward end 124 of the housing 112. To this end, the drive rod 118 includes a cross pin 192. The cross pin 192 extends laterally through the drive rod 118 parallel to transverse axis T. Each scraping member 168*a*, 168*b* defines an arcuate cam aperture 188. Each arcuate cam aperture 188 extends through the body portion 171 of the respective scraping member 168*a*, 168*b*. Each cam aperture 188 is defined through a rearward portion of each scraping member 168*a*, 168*b* opposite the pivot aperture 182 from the extension portion 172. The forward end 124 of the housing 112 defines a pair of opposing blind retaining slots 186. Each retaining slot 186 is formed in an opposing surface of the forward end 124 of each housing portion 112*a*, 112*b*. The pair of opposing blind retaining slots 186 is spaced longitudinally rearward from the pair of opposing pivot studs 178.

As best shown in FIGS. 3 and 8-14, the cross pin 192 of the drive rod 118 is received in the cam aperture 188 of each scraping member 168*a*, 168*b* and the pair of opposing blind retaining slots 186. More specifically, the cross pin 192 extends through the arcuate cam aperture 188 of each scraping member 168*a*, 168*b* and into the pair of opposing blind retaining slots 186 such that the cross pin 192 is captured by and longitudinally slidable within the pair of opposing blind retaining slots 186. The cross pin 192 extends through the drive rod 118 normal to the longitudinal axis L. The cross pin 192 is slidably received in the cam aperture 188 of each scraping member 168 and each retaining slot 186 such that longitudinal motion of the drive rod 118 pivots the scraping members 168*a*, 168*b* about the pivot studs 178. It should be appreciated that the pair of opposing blind retaining slots 186 limit longitudinal movement of the drive rod 118 via the cross pin 192.

Figure 11:
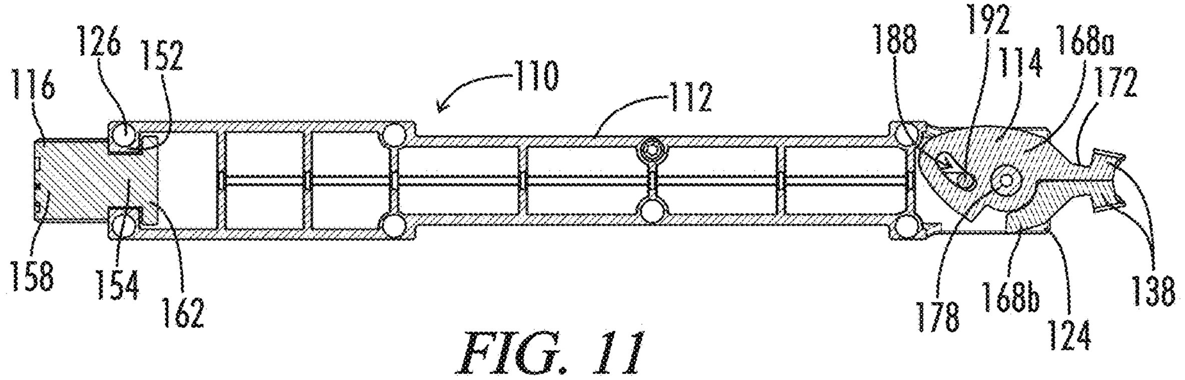
FIG. 11 is a sectional view of the device of FIG. 1 taken along line 11-11 of FIG. 8.
Figure 12:
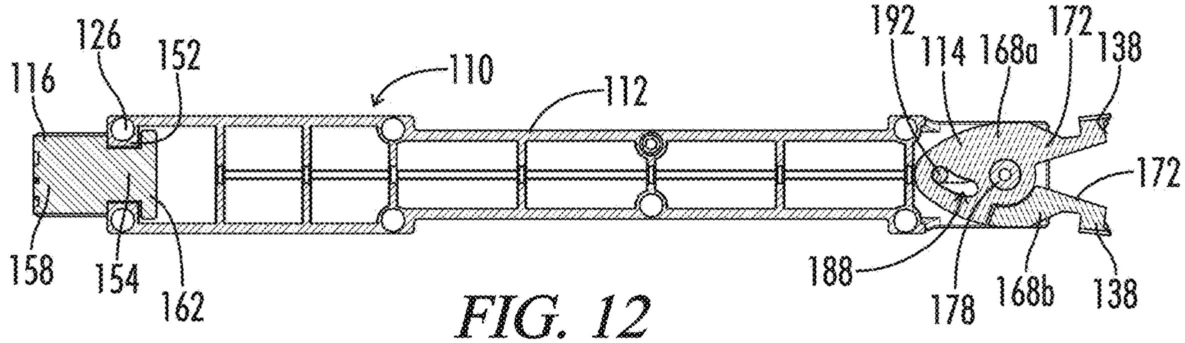
FIG. 12 is a sectional view of the device of FIG. 1 taken along line 11-11 of FIG. 8 showing the device in the open (i.e., expanded) position.
Figure 13:
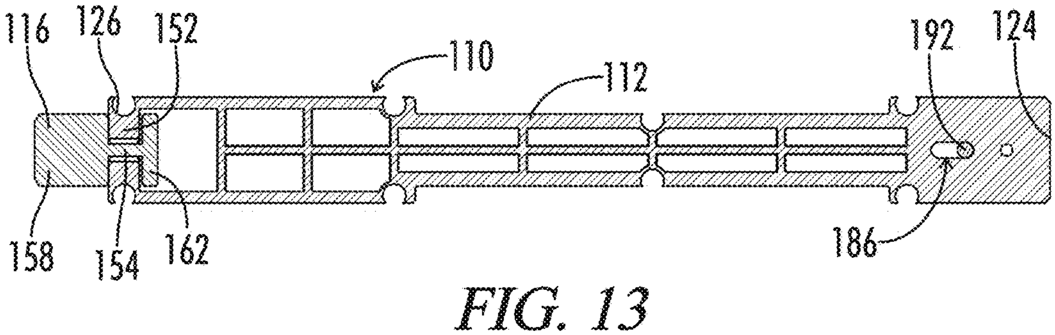
FIG. 13 is a sectional view of the device of FIG. 1 taken along line 13-13 of FIG. 8.
Figure 14:
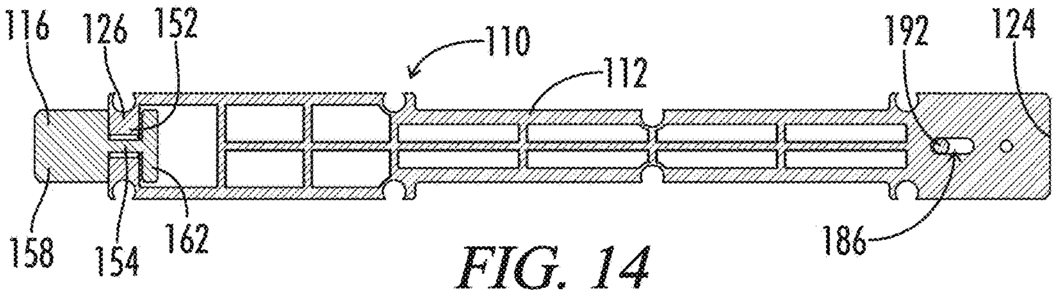
FIG. 14 is a sectional view of the device of FIG. 1 taken along line 13-13 of FIG. 8 showing the device in the open (i.e., expanded) position.

In operation, rotation of the control knob 116 in the first direction 132 translates the drive rod 118 toward the rear end 126 of the housing 112. Translation of the drive rod 118 toward the rear end 126 of the housing 112 in turn slides the cross pin 192 rearward along the arcuate cam apertures 188 of the pair of scraping members 168*a*, 168*b* to pivot the scraping assembly 114 toward the open position, as shown in FIG. 12. When the scraping assembly 114 is in the open position, the cross pin 192 is received in a rear end of the retaining slots 186, as shown in FIG. 14. Rotation of the control knob 116 in the second direction 136 translates the drive rod 118 toward the forward end 124 of the housing 112. Translation of the drive rod 118 toward the forward end 124 of the housing 112 slides the cross pin 192 forward along the arcuate cam apertures 188 of the pair of scraping members 168*a*, 168*b* to pivot the scraping assembly 114 toward the closed position, as shown in FIG. 11. When the scraping assembly 114 is in the closed position, the cross pin 192 is received in a forward end of the retaining slots 186, as shown in FIG. 13.

The scraping assembly 114 is configured with multiple surfaces and features that facilitate smooth and repeatable transitions between the open an closed positions. Each scraping member 168*a*, 168*b* defines an outwardly facing side 20, an inwardly facing side 22, a convex guide surface 196, and a concave guide surface 198. The inwardly facing sides 22 of each scraping member 168*a*, 168*b* are adjacent and maintain the scraping member 168*a*, 168*b* in their respective parallel planes during movement (i.e., pivoting expansion and contraction). Additionally, the convex guide surface 196 of each scraping member 168*a*, 168*b* is slidably received against the concave guide surface 198 the other scraping member such that the guide surfaces 196, 198 of each scraping member maintain the scraping members in alignment and help guide the scraping members during movement (i.e., pivoting expansion and contraction) of the scraping assembly 114 between the open and closed positions.

The scraping assembly 114 also comprises a key 127 and a key receiver 129 to facilitate alignment of the scraping assembly 114 as the scraping members 168*a*, 168*b* are moved toward or into the closed position. Each scraping member 168*a*, 168*b* includes a key 127 protruding from a surface of each head portion 138 that is opposite the surface of the scraping members on which the scraping projections 173 are formed. Each scraping member 168*a*, 168*b* also includes a key receiver 129 in the form of a depression formed in the same surface of each head portion 138 adjacent the key 127. The key 127 and key receiver 129 of each scraping member 168*a*, 168*b* are configured to matingly engage each other when the scraping assembly 114 is in the closed position. Put differently, the key 127 on one scraping member 168*a* is receivable in the key receiver 129 on the other scraping member 168*b* to align the two scraping members when the scraping assembly 114 is moved into or proximate to the closed position. Keys 127 and key receivers 129 can be configured in any shape and size. Preferably, each key 127 and corresponding key receiver 129 are configured to be engaged with each other. As such, each key 127 and corresponding key receiver 129 can have a complementary or mirrored shape so that they fit snugly together and limit transverse movement (i.e., along transverse axis T) of each scraping member 168*a*, 168*b* relative to the other when each key 127 and corresponding key receiver 129 is matingly engaged with the other.

Figure 15:
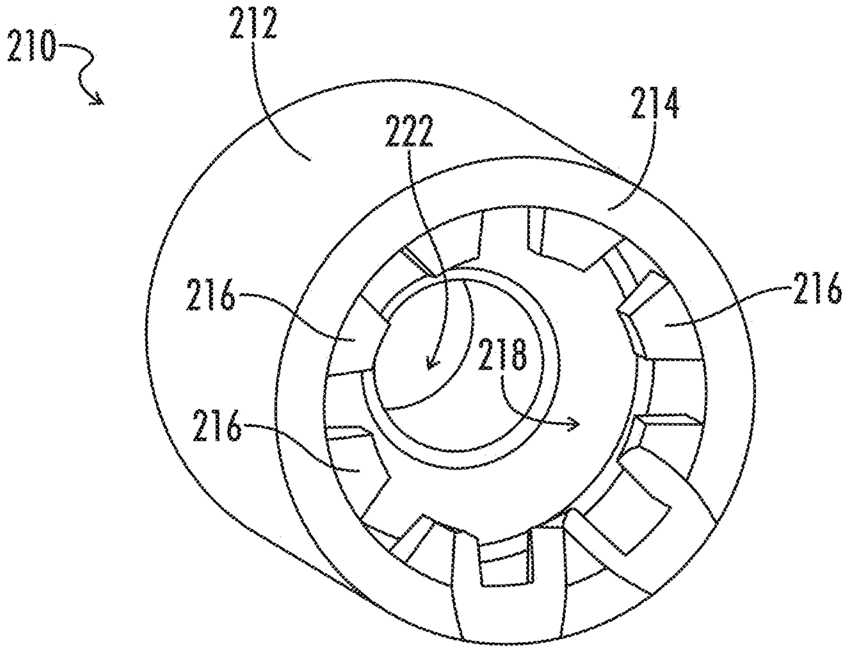
FIG. 15 is a perspective view of an exemplar firearm barrel assembly in which the device of FIG. 1 is receivable to clean an interior surface of the locking lug recess.
Figure 16:
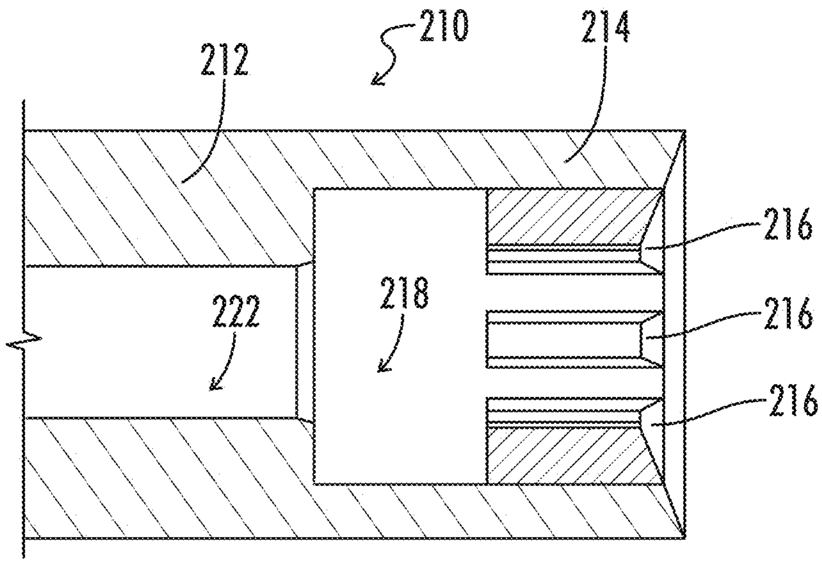
FIG. 16 is a longitudinally sectioned elevational view of the barrel assembly of FIG. 15.

The device 110 is configured to clean an interior surface of a firearm by scraping combustion products (e.g., carbon) and other debris from the locking lug recess 218 of a barrel assembly 210 for a firearm (exemplified in FIGS. 15-16). As is typical of AR-platform firearms, the barrel assembly 210 includes a barrel 212 defining a chamber 222 and a barrel extension 214 secured to the barrel 212 rearward of the chamber 222. The barrel extension 214 includes a plurality of elongated protrusions or "barrel lugs" 216 extending from an interior circumferential surface thereof. The barrel extension 214 defines a space or recess 218 (i.e., the "locking lug recess") located between the barrel lugs 216 and the chamber 222 where a bolt head (not shown) rests when the firearm is in battery.

The device 110 can be used to scrape the locking lug recess 218 by inserting the head 138 and extension 172 portions of the scraping assembly 114 through the mouth of the barrel extension 214 and into the locking lug recess 218 while the scraping assembly 114 is in or near a closed position. The elongate scraping projections 173 on the head portions 138 of the scraping members 168*a*, 168*b* are shaped and sized to slide between the corresponding barrel lugs 216 during insertion of the scraping assembly 114 into the locking lug recess 218. For this reason, the scraping projections 173 are depicted as rectangular prisms. However, the scraping projections 173 can take any other shape which does not prevent the head portions 138 of the scraping members 168*a*, 168*b* from entering the locking lug recess 218.

Once the head portions 138 of the scraping assembly 114 are received in the locking lug recess 218, the control knob 116 is rotated in the appropriate direction to expand or pivot the scraping assembly 114 toward the open position and thereby apply pressure radially outward against the interior circumferential surface of locking lug recess 218. The device 110 is then rotated relative to the barrel assembly 210 such that the scraping edges 174 of the scraping projections 173 scrape the interior surfaces defining the locking lug recess 218. The device 110 is removed from the barrel assembly 210 by rotating the control knob 116 in the appropriate direction to contract or pivot the scraping assembly 114 toward the closed position. The device 110 is then withdrawn from the the barrel assembly 210 through the mouth of the barrel extension 214.

The firearm cleaning device 110 of the present invention represents a significant improvement over prior art cleaning devices by enabling a user to apply radially outward pressure against the interior surface of the locking lug recess 218 of an AR-platform firearm. This in turn permits the user to more reliably and easily clean this important space within a firearm that prior art cleaning devices are unable to properly clean. Additionally, the mechanism of the device 110 controlling expansion and contraction of the scraping assembly 114 simplifies use of the device by employing leverage and friction to maintain the scraping members 168*a*, 168*b* in the same position relative to one another until such time as a user manually changes their position via the control knob 116. As such, a user may vigorously rotate the device 110 when the scraping assembly 114 is received in the locking lug recess 218 of a firearm without fear that the scraping assembly 114 will involuntarily contract toward the closed position. This advantageously prevents a user from having to apply constant manual pressure to the control knob to maintain the radially outward pressure against the locking lug recess 218.

Although embodiments of the present invention have been described in detail, it will be understood by those skilled in the art that various modifications can be made therein without departing from the spirit and scope of the invention as set forth in the appended claims. For example, the scraping assembly 114 may be connected to the drive rod 118 such that the scraping members 168 pivot from the closed position toward the open position when the drive rod 118 translates toward the forward end 124 and vice versa. Additionally, in some embodiments, instead of pivot studs 178 on the housing 112, the scraping members 168*a*, 168*b* can include a projection which can be pivotably coupled to the housing 112 such that the scraping assembly 114 can rotate or pivot around such projection(s) in order to allow the scraping assembly 114 to be moved into and between the open and closed positions. Alternatively, in some embodiments, instead of a pivot stud 178, each pivot aperture 182 can receive a pin, screw, bolt, rivet, other fastener, or any other element around which the scraping assembly 114 may rotate or pivot.

Additionally, although the housing 112 is depicted herein as including two opposing halves 112*a*, 112*b* secured together using threaded fasteners, in other embodiments, the housing 112 can be a single monolithic piece or member. In additional embodiments, the housing can include three or more pieces or members secured together. Housing pieces can be secured together using screws or other fasteners, adhesive, heat bonding or welding, or any other suitable coupling method. Additionally, the housing 112 and control knob 116 can include one or more surface texture features 199, such as depressions, protrusions, knurling, or any other feature which may facilitate manual manipulation of the device 110 by a user. The device 110 and its various components can be formed from any one or more substantially rigid materials including but are not limited to metals, metal alloys, and hard polymeric materials, among others.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific apparatus and methods described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A device for cleaning an interior surface of a firearm, the device comprising:

a housing extending longitudinally along a longitudinal axis, the housing having a forward end and a rear end longitudinally opposite the forward end;

a control knob at the rear end of the housing;

a drive rod received within the housing and coupled to the control knob; and a scraping assembly at the forward end of the housing configured to pivot between an open position and a closed position, the scraping assembly comprising:

a pair of scraping members pivotally connected to and extending beyond the housing and movably connected to the drive rod, each scraping member defining a convex guide surface and a concave guide surface against which the convex guide surface of the other scraping member of the pair is slidably received, wherein the control knob is configured to rotate:

in a first direction to move the drive rod and accordingly pivot the pair of scraping members apart from one another in the open position; and in a second direction opposite the first direction to move the drive rod and accordingly pivot the pair of scraping members together in the closed position.

2. The device of claim 1, wherein:

rotation of the control knob in the first direction translates the drive rod toward one end of the housing and pivots the scraping assembly toward the open position; and rotation of the control knob in the second direction translates the drive rod toward the other end of the housing and pivots the scraping assembly toward the closed position.

3. The device of claim 1, wherein:

the drive rod is threadably coupled to the control knob; and the control knob is rotatably coupled to the rear end of the housing.

4. The device of claim 1, wherein:

the control knob defines a threaded socket in which the drive rod is threadably received;

rotation of the control knob in the first direction translates the drive rod toward the rear end of the housing and expands the scraping assembly; and rotation of the control knob in the second direction translates the drive rod toward the forward end of the housing and contracts the scraping assembly.

5. The device of claim 1, wherein the rear end of the housing is configured to substantially prevent longitudinal movement of the control knob relative to the housing without restricting rotation of the control knob relative to the housing.

6. The device of claim 1, wherein:

the rear end of the housing includes an inwardly protruding collar;

the control knob includes a neck; and the collar is received in the neck whereby longitudinal movement of the control knob relative to the housing is substantially prevented but rotation of the control knob relative to the housing is unrestricted.

7. The device of claim 6, wherein:

the control knob includes a main body adjacent the neck and a circular flange opposite the neck from the main body;

the neck has a diameter less than that of the main body and the circular flange; and the circular flange is received inside the rear end of the housing adjacent the collar.

8. The device of claim 1, wherein:

each scraping member includes an extension portion having a forward end, a head portion at the forward end of the extension portion, and at least one scraping projection formed on the head portion; and each extension portion extends out of the housing such that each at least one scraping projection is distal to the forward end of the housing.

9. The device of claim 8, wherein the scraping projections formed on the head portions are closer together when the scraping assembly is in the closed position than when the scraping assembly is in the open position.

10. The device of claim 8, wherein:

the head portions of the pair of scraping members are adjacent when the scraping assembly is in the closed position; and the head portions of the pair of scraping members are spaced apart when the scraping assembly is not in the closed position.

11. The device of claim 8, wherein:

the forward end of the housing defines a pair of opposing pivot studs; and each scraping member defines a pivot aperture in which a respective pivot stud of the pair of pivot studs is received such that each scraping member is pivotable about the respective pivot stud.

12. The device of claim 8, wherein:

the forward end of the housing defines a pair of opposing blind retaining slots;

each scraping member defines a cam aperture extending therethrough;

the drive rod includes a cross pin which extends through the cam aperture of each scraping member and into the pair of opposing blind retaining slots such that the cross pin is captured by and longitudinally slidable within the pair of opposing blind retaining slots; and the pair of opposing blind retaining slots limit longitudinal movement of the drive rod via the cross pin.

13. The device of claim 8, wherein:

the forward end of the housing defines a pair of opposing pivot studs and a pair of opposing blind retaining slots spaced longitudinally rearward from the pair of opposing pivot studs;

each scraping member defines a pivot aperture and a cam aperture positioned opposite the pivot aperture from the extension portion;

each pivot stud of the pair of opposing pivot studs is received in a respective pivot aperture of the pair of scraping members;

the drive rod includes a cross pin which extends normal to the longitudinal axis; and the cross pin is slidably received in the cam aperture of each scraping member and in each retaining slot such that longitudinal motion of the drive rod pivots the scraping members about the pivot studs.

14. A device for cleaning an interior surface of a firearm, the device comprising:

a housing having a first end and a second end;

a control knob rotatably coupled to the second end of the housing;

a drive rod received within the housing and coupled to the control knob; and a scraping assembly at the first end of the housing configured to pivot between an open position and a closed position, the scraping assembly comprising:

a pair of scraping members pivotally connected to and extending beyond the housing and movably connected to the drive rod, each scraping member defining a convex guide surface and a concave guide surface against which the convex guide surface of the other scraping member of the pair is slidably received, wherein the control knob is configured to rotate:

in a first direction to translate the drive rod toward the second end of the housing and accordingly pivot the pair of scraping members apart from one another in the open position; and in a second direction opposite the first direction to translate the drive rod toward the first end of the housing and accordingly pivot the pair of scraping members together in the closed position.

15. The device of claim 14, wherein:

the control knob defines a threaded socket in which the drive rod is threadably received;

rotation of the control knob in the first direction draws the drive rod into the socket; and rotation of the control knob in the second direction extends the drive rod from the socket.

16. The device of claim 15, wherein the control knob and the second end of the housing are configured to substantially limit movement of the control knob relative to the housing to bidirectional rotation about a single axis.

17. The device of claim 15, wherein:

the drive rod includes a cross pin;

the first end of the housing defines a pair of opposing blind retaining slots;

each scraping member defining an arcuate cam aperture through which the cross pin extends into the pair of opposing blind retaining slots;

translation of the drive rod toward the second end of the housing slides the cross pin along the arcuate cam apertures of the pair of scraping members to pivot the scraping assembly toward the open position; and translation of the drive rod toward the first end of the housing slides the cross pin along the arcuate cam apertures of the pair of scraping members to pivot the scraping assembly toward the closed position.

18. A device for cleaning an interior surface of a firearm, comprising:

a housing having a longitudinal axis, a forward end, and a rear end longitudinally opposite the forward end;

first and second scraping members pivotally connected to and extending beyond the housing at the forward end thereof, each scraping member including an extension portion extending out of the forward end of the housing, the first and second scraping members configured to pivot relative to the housing between a closed position wherein the extension portions are adjacent and an open position wherein the extension portions are spaced apart, each scraping member defining a convex guide surface and a concave guide surface against which the convex guide surface of the other scraping member of the pair is slidably received;

a drive rod received within the housing and movably connected to the first and second scraping members, the drive rod configured to pivot the first and second scraping members toward the open position when the drive rod is translated toward the rear end of the housing, and toward the closed position when the drive rod is translated toward the forward end of the housing; and a control knob at the rear end of the housing threadably coupled to the drive rod, wherein rotation of the control knob in a first direction translates the drive rod toward the rear end of the housing to pivot the first and second scraping members apart from one another in the open position, and rotation of the control knob in a second direction opposite the first direction translates the drive rod toward the forward end of the housing to pivot the first and second members together in the closed position.

* * * * *